United States Patent
Ozawa et al.

(10) Patent No.: US 7,522,296 B2
(45) Date of Patent: Apr. 21, 2009

(54) DISPLAY PROCESSING APPARATUS WITH A DISPLAY COMPONENT FOR DISPLAYING A SCREEN BASED ON A DISPLAY PATTERN AND AN IMAGE PROCESSING APPARATUS

(75) Inventors: Hidekazu Ozawa, Ebina (JP); Akihiro Enomoto, Ebina (JP); Yukio Tajima, Ebina (JP); Yuji Hikawa, Ebina (JP); Kazuko Kirihara, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 946 days.

(21) Appl. No.: 10/660,484

(22) Filed: Sep. 12, 2003

(65) Prior Publication Data

US 2004/0190034 A1 Sep. 30, 2004

(30) Foreign Application Priority Data

Mar. 24, 2003 (JP) ............................. 2003-081356

(51) Int. Cl.
G06F 3/12 (2006.01)
H04N 1/60 (2006.01)
G06K 15/00 (2006.01)

(52) U.S. Cl. ...................... 358/1.13; 358/1.9; 358/1.15; 358/1.16

(58) Field of Classification Search ................. 358/1.15, 358/1.13, 1.16, 1.9
See application file for complete search history.

(56) References Cited

U.S. PATENT DOCUMENTS

| 5,727,135 A  | *  | 3/1998  | Webb et al.     | 358/1.14 |
| 6,615,297 B1 | *  | 9/2003  | Beard et al.    | 710/62   |
| 6,804,018 B1 | *  | 10/2004 | Mochizuki       | 358/1.14 |
| 6,924,826 B1 | *  | 8/2005  | Nakagiri et al. | 715/700  |

FOREIGN PATENT DOCUMENTS

| JP | A 2001-306594 | 11/2001 |
| JP | A-2002-182877 | 6/2002  |

* cited by examiner

Primary Examiner—Edward L Coles
Assistant Examiner—Thomas J Lett
(74) Attorney, Agent, or Firm—Oliff & Berridge, PLC

(57) ABSTRACT

The present invention provides a display screen depending on a display pattern of an image processing apparatus. On the basis of UI information described in an instruction data, screen information, which can be operationally input and displayed, on a screen for the user is generated, and the display screen is displayed. Parameters and pieces of attribute information held by the parameters are described in the UI information, screen information depending on the attribute information is generated and displayed on a display component. The attribute information includes information representing changeable or unchangeable and an input limit value. For this reason, a display pattern and an operation input pattern of the item information displayed on the display component can be changed.

24 Claims, 13 Drawing Sheets

FIG.3

| I/F INFORMATION |
|---|
| SERVICE TYPE |
| SERVICE NAME |
| SERVICE ICON |
| LOCATION INFORMATION |
| INPUT |
| OUTPUT |
| PARAMETER RESTRICTION RULE |
| SERVICE LOCATION |
| METHOD NAME |
| INVOCATION SCHEME |
| IMPLICIT ELEMENT |

FIG.5

| INSTRUCTION DATA |
| --- |
| SERVICE TYPE |
| SERVICE NAME |
| SERVICE ICON |
| LOCATION INFORMATION |
| INPUT |
| OUTPUT |
| PARAMETER RESTRICTION RULE |
| SERVICE LOCATION |
| METHOD NAME |
| INVOCATION SCHEME |
| IMPLICIT ELEMENT |
| FLOW<br>(INVOCATION, MAP, METHOD)<br>(CONTROL STRUCTURE, LOGIC OPERATION) |

FIG.6

```
EXAMPLE OF INSTRUCTION DATA OF SCREEN FORMATION

<UI>
 <Popup>
   <Title name="MAGNIFICATION SELECTION">
    <Button>
    <Button name="CLOSE"/>
    <Button type="close"/>
      <Layout>
        <x value="700"/>
        <y value="5"/>
      </Layout>
    </Button>
<Text>
 <Text type="text" value="(25~400)"/>
      <Layout>
        <x value="220"/>
        <y value="150"/>
      </Layout>
</Text>
<Text>
 <Text type="text" value="%"/>
      <Layout>
        <x value="350"/>
        <y value="220"/>
      </Layout>
</Text>
<Text>
 <Text type="numeric" editable="true" bgcolor="black"/>
      <Layout>
        <x value="220"/>
        <y value="2000"/>
      </Layout>
        <Min value="25"/>
        <Max value="400"/>
</Text>
 </Popup>
</UI>
```

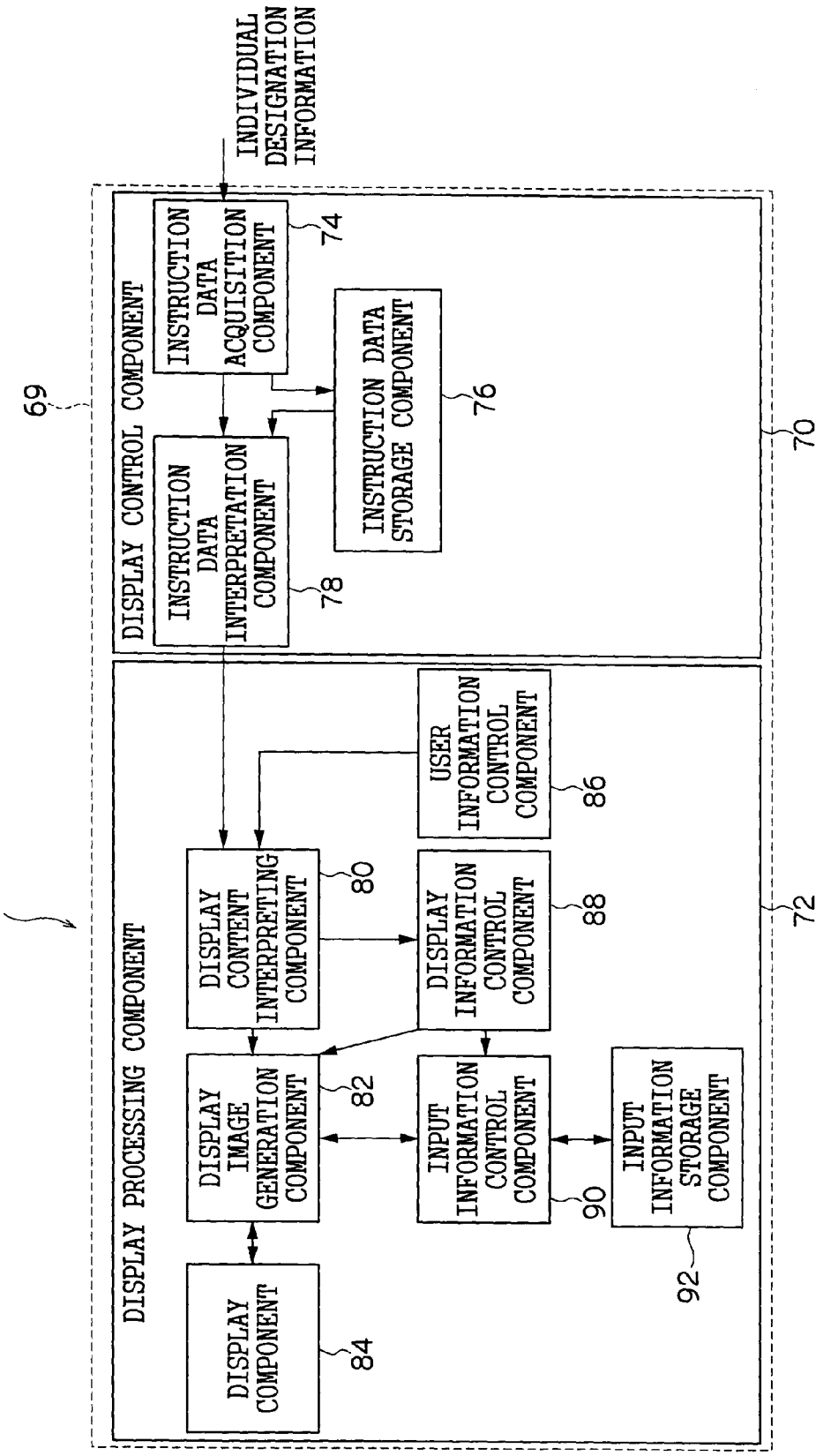

FIG.12

| | | | |
|---|---|---|---|
| MAGNIFICATION SELECTION | | | CLOSE |
| | (25~400) | | |
| | 100 % | | |
| | 96 | | |
| | | | |
| | | | |
| | | | |

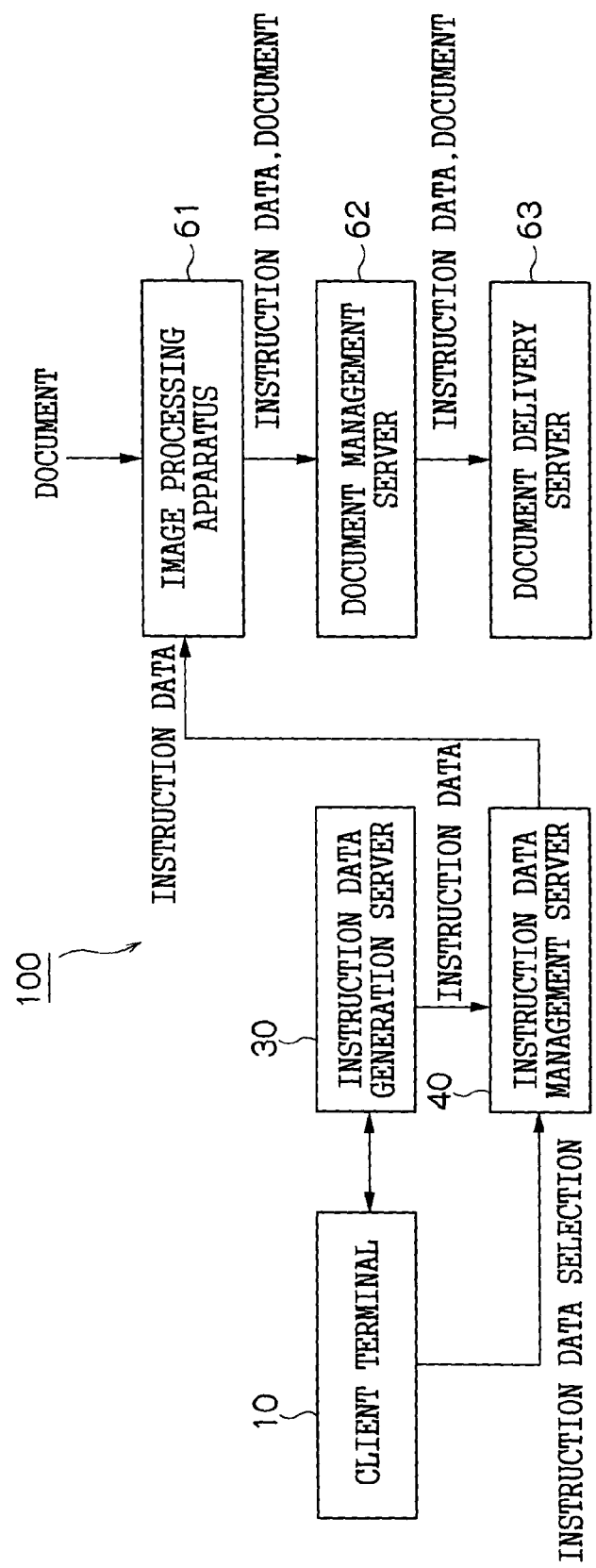

DISPLAY PROCESSING APPARATUS WITH A DISPLAY COMPONENT FOR DISPLAYING A SCREEN BASED ON A DISPLAY PATTERN AND AN IMAGE PROCESSING APPARATUS

CROSS-REFERENCE TO RELATED APPLICATION

This application claims priority under 35 USC 119 from Japanese Patent Application No. 2003-81356, the disclosure of which is incorporated by reference herein.

BACKGROUND OF THE INVENTION

1. Field of the Invention

The present invention relates to an image processing apparatus, and an image processing method and, more particularly, to an image processing apparatus for performing processes in accordance with an instruction data which expresses a plurality of processes to be performed to document data as a series of processes, and an image processing method.

2. Description of the Related Art

A conventional complex machine in which a facsimile function, a scanner function, a printer function, and the like are integrated with a copying machine is proposed. Such a complex machine is connected to a network to which a personal computer (PC) or the like is connected, so that a paperwork which uses a copying machine, a facsimile, and the like using paper as main media can be associated with document processes which are converted to electronic form on a PC.

More specifically, a paper document can be scanned to transfer the scanned data to a personal computer, a document received by a facsimile function can be directly transmitted to a PC as image data without being printed, or another process can be performed. In addition, after a paper document or a facsimile-received document converted to electronic form, a large number of procedures and processes are desirably associated with each other and automatized.

For this reason, the following technique is proposed. That is, a large number of job templates each constituted as a computerized file in which a desired setting related to an item to be set by a complex machine in advance is described are prepared according to process contents and stored, a job template corresponding to desired contents is designated in the large number of job templates, and the process is executed.

However, in this technique, since there are a large number of job templates, a long time was disadvantageously required to find out and designate a desired job template among the large number of job templates.

As a technique, which can be applied to solve this problem, the following technique is disclosed. That is, desired documents are retrieved from a large number of documents, which are stored in advance, and basic information retrieval is performed depending on an information request of the user to support next-stage retrieval (narrowing down) in the retrieved document group. On the basis of a retrieval result obtained as described above, information of an operable output screen is generated to the user and transferred to the user terminal (for example, see Japanese Patent Application Laid-Open (JP-A) No. 2001-306594 (FIG. 2 pages 10 to 11)).

When this technique is applied to a complex machine and a PC which are connected to the network, the information of the output screen can be transferred to the complex machine and the PC. For this reason, the transferred output screen can be displayed on the apparatus side such as the PC or the complex machine.

However, in the above prior art, on the PC or complex machine side, the transferred output screen can be displayed. However, in the function of this output screen consideration was not given to the size, functions, and the like of a display device arranged on the PC or complex machine side. This output screen was not formed in consideration of an operation performed by the user of the PC or the complex machine. For this reason, there were occasions when requests had to be made to transfer, information of an output screen depending on a display pattern or an operation mode on the processing apparatus side connected to the network.

SUMMARY OF THE INVENTION

The present invention has been made to solve the above problem, and has as its object to provide an image processing apparatus and an image processing method which can provide a display screen depending on a display pattern and an operation mode of the image processing apparatus.

In order to achieve the above object, according to the invention, there is provided an image processing apparatus including: an acquisition component for acquiring an instruction data in which process information representing as a series of processes a process performed to document data and setting information including at least a setting item and a setting value for setting execution contents of the processes are described; a display component for displaying a screen on the basis of screen information which can include an operation screen for setting a piece of setting information described in the instruction data; a designation component for, when the setting information included in the instruction data has an attribute representing that a change of the setting information is limited, designating as a display pattern of the setting information having the attribute a display pattern different from the display pattern of changeable setting information; and a display information control component for outputting screen information for displaying the setting information in accordance with the display pattern.

The information processing apparatus according to the invention includes the acquisition component in order to acquire an instruction data in which process information and setting information are described. The process information expresses as a series of processes at lest one process performed to document data. The setting information includes at least a setting item and a setting value for setting execution contents of processes. The document data is information related to documents. For example, the document data is character information such as text data, image information obtained by reading a paper document, or the like. The process information expresses as a series of processes a process performed to document data processes, and expresses co-ordination between processes related to document data. A setting item and a setting value for setting execution contents of processes may be set in advance at predetermined values as initial values, and it is also acceptable to require the input of a setting value.

The display component displays screen information. The screen information can include an operation screen for setting a piece of setting information described in an instruction data. More specifically, the setting information is displayed on the operation screen, and the setting information can be set and changed through the operation screen. The instruction data may have an attribute representing that the setting information included in the instruction data must not be changed. When the instruction data includes the setting information having an attribute representing that the setting information included in the instruction data must not be changed, the designation component designates as a display pattern of the setting information having the attribute representing prohibition of changing, a display pattern different from the display pattern of changeable setting information. A display pattern different from a changeable display pattern, e.g., a display of a message representing that the setting information is unchangeable, a change in display color, and the like is designated as a display pattern of the setting information having the attribute representing prohibition of changing.

The display information control component outputs screen information for displaying setting information depending on a display pattern. The display component displays the screen information output from the display information control component.

For this reason, when setting information described in the instruction data has an attribute representing that the setting information must not be changed, the setting information having the attribute of the prohibition of changing can be displayed in a display pattern different from that of changeable setting information. Therefore, a display pattern to be displayed can be changed depending on the attribute of the setting information described in the instruction data, and an expandable operation screen can be provided.

The designation component can designate the setting information of the display pattern as a non-display pattern. When the designation component designates setting information having an attribute representing prohibition of changing as a non-display pattern, screen information depending on a display pattern for setting the setting information having the attribute representing prohibition of changing in a non-display pattern is input to the display component. Therefore, an operation screen can be displayed such that the setting information having the attribute representing prohibition of changing is not displayed.

The designation component can designate the display pattern as a pattern in which image information representing that the setting information is not changeable is added. The designation component can designate a pattern in which a message representing that the setting information is not changeable or image information such that image information in which unchangeable setting information is displayed in gray is added. For this reason, image information can be displayed which shows to the user that the setting information, which has the attribute representing prohibition of changing, is not changeable.

The designation component can designate a display pattern of the setting information as a fixed pattern. The designation component can designate a display pattern of setting information having an attribute representing prohibition of changing as a fixed pattern. For this reason, the setting information having the attribute representing prohibition of changing can be displayed in a fixed pattern, i.e., can be displayed in the display component in a pattern in which the setting information cannot be set by the user.

When a usage authorization is set for the setting information included in the instruction data, the designation component can designate the display pattern on the basis of the usage authorization. The usage authorization can be set in the setting information included in the instruction data. The usage authorization represents an authorization for a time when the image processing apparatus is operated or used. Users using the image processing apparatus are classified depending on authorizations, which can be used by the respective users. When the usage authorization is set in the setting information, the designation component designates a display pattern on the basis of the usage authorization. The designation component designates a display pattern, e.g., a display pattern in which a display pattern of setting information as a non-display pattern according to a usage authorization, or a display pattern in which image information representing that the setting information is changeable is added, or the like. For this reason, an operation screen on which a display pattern can be changed depending on the usage authorization and which is expandable can be provided.

The image processing apparatus according to the invention includes: an acquisition component for acquiring an instruction data in which process information representing as a series of processes a process performed to document data and setting information including at least a setting item and a setting value for setting execution contents of processes are described; a display component for displaying a screen on the basis of screen information which can include an operation screen for setting a piece of setting information described in the instruction data; an input component for inputting the setting information; and an evaluation component for evaluating, when setting information included in the instruction data has an attribute representing that the setting information is changeable, the setting information input by the input component on the basis of the attribute.

The image processing apparatus according to the invention includes the acquisition component in order to acquire an instruction data in which process information and setting information are described. The process information expresses as a series of processes a process performed to document data. The setting information includes at least a setting item and a setting value for setting execution contents of processes. The document data is information related to documents. For example, the document data is character information such as text data, image information obtained by reading a paper document, or the like. The process information expresses as a series of processes a process performed to document data, and expresses co-ordination between processes related to document data. A setting item and a setting value for setting execution contents of processes may be set at predetermined values as initial values in advance, and it is also acceptable to require the input of a setting value.

The display component displays screen information. The screen information can include an operation screen for setting a piece of setting information described in an instruction data. The input component inputs the setting information. The instruction data can have an attribute representing that the setting information included in the instruction data is changeable. When the setting information has an attribute representing that the setting information is changeable, and when the setting information is input by the input component, the evaluation component performs evaluation on the basis of the attribute of the input setting information. For this reason, the setting information input by the input component can perform evaluation on the basis of the attribute of the setting information described in the instruction data.

The evaluation component can evaluate the fact that, when an inputtable range of the setting information is expressed as the attribute, an input value of the setting information obtained by the input component falls within the inputtable range. The instruction data can have an attribution representing the inputtable range of setting information included in the instruction data. This inputtable range is expressed by an inputtable maximum value and an inputtable minimum value. When the setting information having the attribute representing the inputtable range is input by the input component, the evaluation component can evaluate the fact that an input value obtained by the input component falls within the inputtable range. For this reason, the fact that the setting information input by the input component falls within the inputtable range can be evaluated on the basis of the information representing the inputtable range expressed by the attribute of the setting information described in the instruction data.

The evaluation component can evaluate, when input essentiality of the setting information is expressed as the attribute, whether inputting of the setting information is performed by the input component. The instruction data can have an attribute expressing input essentiality representing that absolute inputting of setting information included in the instruction data must be performed. The evaluation component can evaluate inputting of the setting information performed by the input component, which setting information has the attribute expressing input essentiality. In this way on the basis of information expressing input essentiality expressed as an attribute of setting information included in the instruction data it is possible to prevent the omission of setting information which must be essentially input.

The evaluation component can evaluate the fact that, when an input character type of the setting information is expressed as the attribute, an input value of the setting information obtained by the input component is the input character type. The instruction data can have an attribute expressing an input character type of the setting information included in the instruction data. When the setting information having the attribute expressing the input character type is input by the input component, the evaluation component can evaluate the fact that the input value obtained by the input component is the input character type expressed as the attribute. For this reason, the fact that the setting information input by the input component is the input character type of the attribute of the setting information can be evaluated on the basis of information expressed by the attribute of the setting information described in the instruction data.

The display component can further display screen information representing an evaluation result obtained by the evaluation component. Since the screen information representing the evaluation result obtained by the evaluation component can be displayed on the display component, when an input character type different from the attribute of the setting information and setting information falling outside the inputtable range are input to the input component, the evaluation result can be provided by means of an error message, a change in display color, or the like.

The image processing apparatus can further include a change component for changing input setting information into predetermined setting information when the evaluation result of the evaluation component is evaluated to be incorrect. When the evaluation result obtained by the evaluation component is incorrect, the change component changes setting information input by the input component into predetermined setting information such as a predetermined value stored in advance. For this reason, the setting information input by the input component can be corrected such that the evaluation result obtained by the evaluation component be a correct value.

The image processing apparatus further includes a setting information storage component for storing setting information input by the input component. When the next screen information is displayed, the setting information stored in the setting information storage component can be used. The setting information storage component can store the setting information input by the input component. The setting information stored in the setting information storage component can be displayed when the next screen information is displayed on the display component. For this reason, since the setting information input by the last input component can be displayed as an initial value before inputting is performed by the input component, more detailed input support can be achieved for the user.

An expandable operation screen can be provided by the following image processing method. More specifically, the image processing method which can acquire an instruction data in which process information representing as a series of processes a process performed to document data and setting information including at least a setting item and a setting value for setting execution contents of the processes are described includes the steps of: displaying a screen on the basis of screen information which can include an operation screen for setting a piece of setting information described in the instruction data; designating, when the setting information included in the instruction data has an attribute representing that a change of the setting information is restricted, as a display pattern of the setting information having the attribute a display pattern different from the display pattern of changeable setting information; and outputting screen information for displaying the setting information depending on the display pattern.

An expandable operation screen can be provided by the following image processing method. More specifically, the image processing method which can acquire an instruction data in which process information representing as a series of processes a process performed to document data and setting information including at least a setting item and a setting value for setting execution contents of the processes are described includes the steps of: displaying a screen on the basis of screen information which can include an operation screen for setting a piece of setting information described in the instruction data; inputting the setting information; and evaluating, when setting information included in the instruction data has an attribute representing that the setting information is changeable, the input setting information on the basis of the attribute.

A superior and expandable operation screen can be provided by causing a computer to process the next image processing program. More specifically, the image processing program executed in a computer which acquires an instruction data in which process information representing as a series of processes a process performed to document data and setting information including at least a setting item and a setting value for setting execution contents of the processes are described includes instructions to: display screen information which can include an operation screen for setting a piece of setting information described in the instruction data; designate, when the setting information included in the instruction data has an attribute representing that a change of the setting information is restricted, as a display pattern of the setting information having the attribute a display pattern different from the display pattern of changeable setting information; and output screen information for displaying the setting information depending on the display pattern. A data signal expressing the program may be included in a carrier wave, and the carrier wave may be included in a storage medium.

A superior and expandable operation screen can be provided by causing a computer to perform the next image processing program. More specifically, the image processing program which acquires an instruction data in which process information representing as a series of processes a process performed to document data and setting information including at least a setting item and a setting value for setting execution contents of the processes are described includes instructions to: display screen information which can include an operation screen for setting a piece of setting information described in the instruction data; input the setting information; and evaluate, when setting information included in the instruction data has an attribute representing that the setting information is changeable, the input setting information on the basis of the attribute. A data signal expressing the program may be included in a carrier wave, and the carrier wave may be included in a storage medium.

The image processing apparatus and the image processing method according to the invention can acquire an instruction data in which process information representing as a series of processes a process performed to document data and setting information including at least a setting item and a setting value for setting execution contents of the processes are described, can display screen information formulated on the basis of pieces of attribute information held by pieces of setting information included in the direction, and can control a value input through screen information based on the attribute information. For this reason, a compatible and expandable display screen can be provided.

BRIEF DESCRIPTION OF THE DRAWINGS

FIG. 3 is a conceptual diagram showing interface (I/F) information.

FIG. 5 is a conceptual diagram showing an instruction data.

FIG. 6 shows an example of UI information described in an XML format.

FIG. 7 is a block diagram showing a display function component of an image processing apparatus.

FIG. 12 is an image diagram showing an example of a display screen displayed in accordance with UI information.

FIG. 13 is a block diagram showing another application example of the invention to explain interrelations between service processing devices constituting a document processing system.

DETAILED DESCRIPTION OF THE INVENTION

A preferred embodiment of the present invention will be described below in detail with reference to the accompanying drawings.

(System Configuration)

Figure 1:
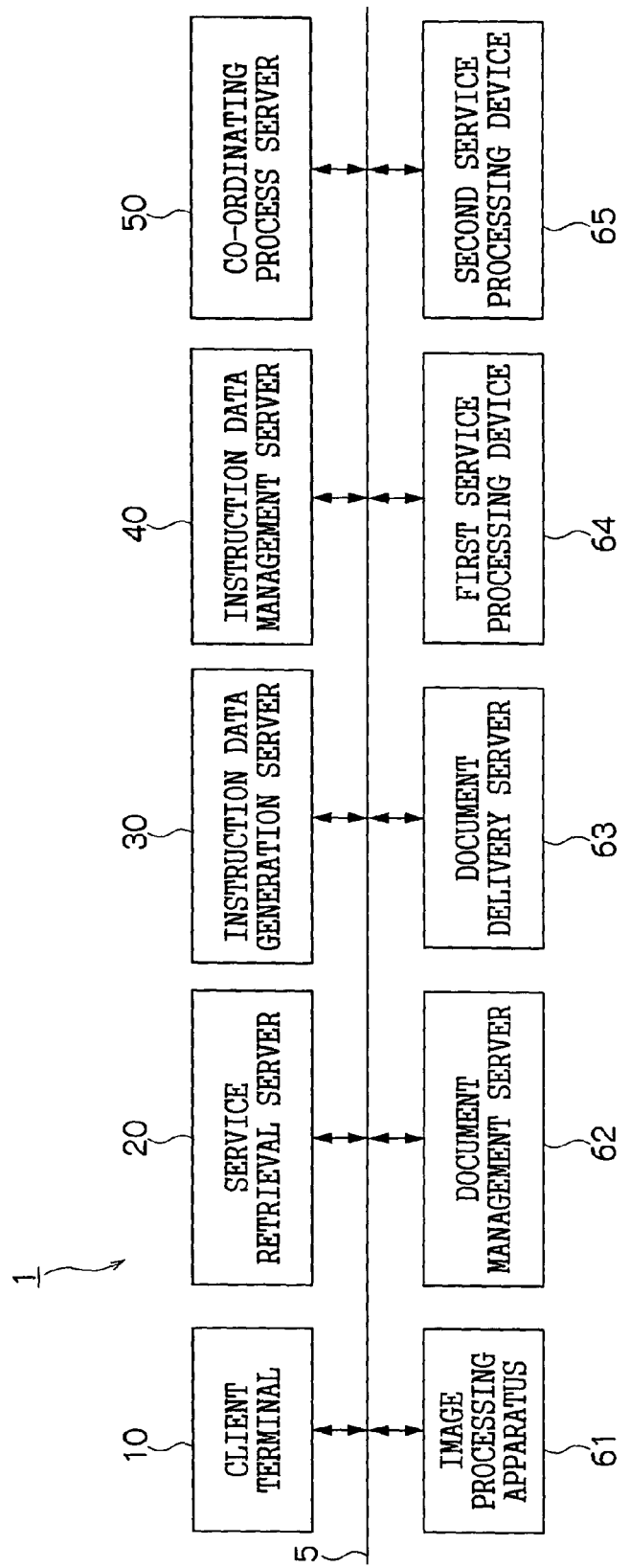
FIG. 1 is a block diagram showing the configuration of a document processing network system according to the first embodiment of the present invention.

FIG. 1 is a block diagram showing the configuration of a document processing system 1 according to this embodiment.

In the document processing system 1, various services and various applications are connected to each other through a network 5. The services mentioned here correspond to functions performed according to external requests and related to documents. The services correspond to, e.g., a copying process, a printing process, a scanning process, a facsimile transmitting/receiving process, an e-mail deliver operation process, a storing in a repository process, a reading from the repository operation, an OCR (Optical Character Recognition) process, a noise reduction process, and the like, respectively. However, the invention is not limited to these processes.

The document processing system 1 comprises, in detail, a client terminal 10 having a user interface which incorporates a plurality of services to designate a desired process of the user, a service retrieval server 20 for retrieving a desired service of the user, an instruction data generation server 30 for forming an instruction data on the basis of information related to service co-ordination designated by the client terminal 10, an instruction data management server 40 for managing the instruction data, and a co-ordinating process server 50 for executing a co-ordinating process of the respective services according to the instruction data.

Furthermore, the document processing system 1 further comprises an image processing apparatus 61 for performing image processing such as a noise reduction process of an image document, an image rotating process, an OCR process, or an image binding process, a document management server 62 for managing documents, a document delivery server 63 for delivering documents, a first service processing device 64 for performing a first service process, and a second service processing device 65 for performing a second service process.

In this embodiment, the document processing system 1 has a configuration in which a plurality of servers for performing predetermined service processes are connected to each other through the network 5. However, it is satisfactory if the plurality of services are connected to each other through the network 5, and the invention is not limited to the configuration.

The instruction data mentioned here is data including information representing relations between functions and interface (I/F) information for calling functions when a series of processes are disassembled into a plurality of functional processes.

Figure 2:
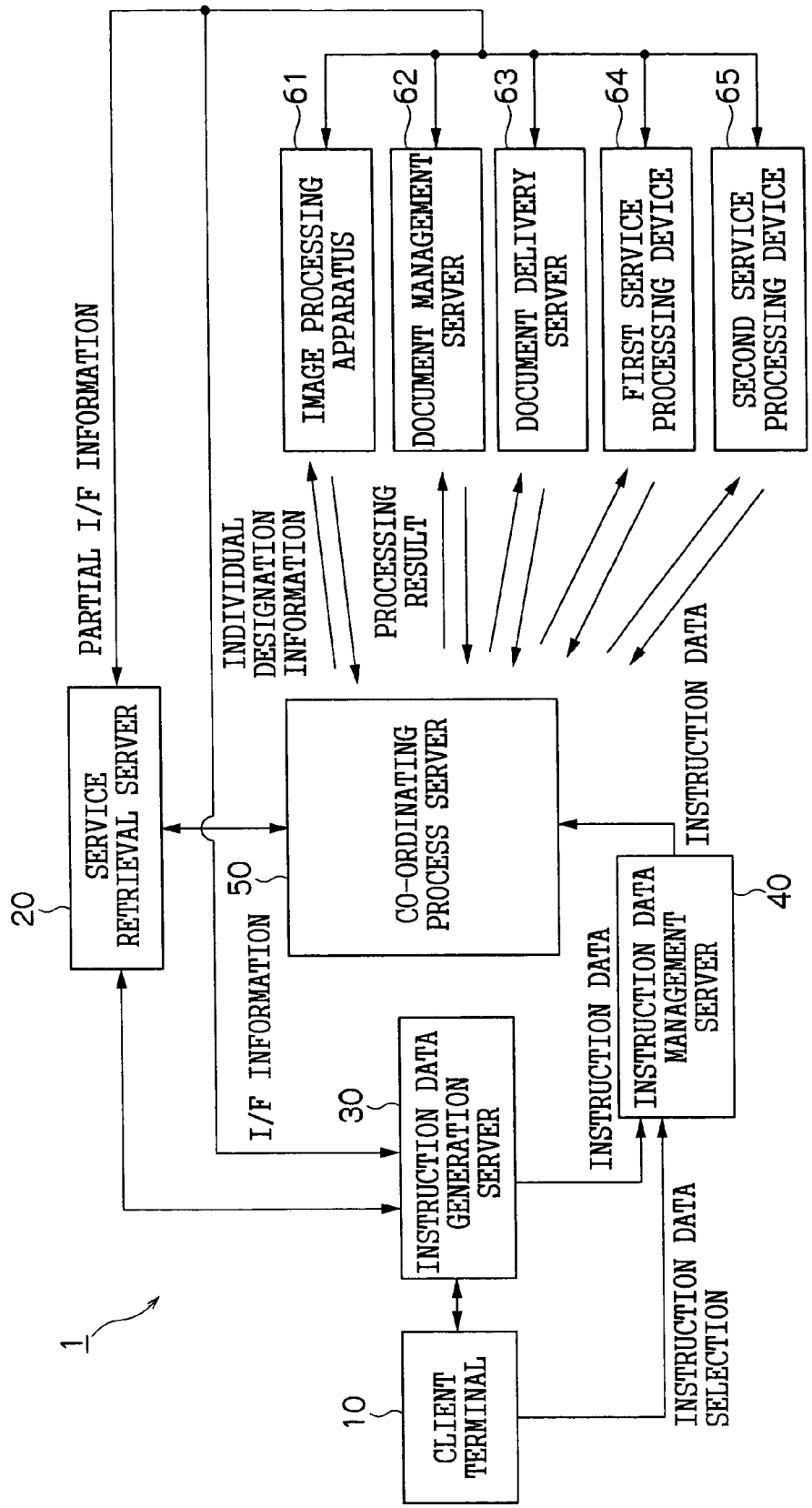
FIG. 2 is a block diagram showing the functional configuration of a complex machine.

FIG. 2 is a block diagram for explaining interrelations between service processing devices such as the image processing apparatus 61, the document management server 62, the document delivery server 63, the first service processing device 64, and the second service processing device 65 which constitute the document processing system 1. The service processing devices store pieces of I/F information representing the contents of services provided by the service processing devices, respectively.

FIG. 3 is a diagram showing the configuration of the I/F information. The I/F information is constituted by <Service Class>, <Service Name>, <Service Icon>, <Service Info. Location>, <Input>, <Output>, <Parameter Restriction Rules>, <Service Location>, <Method Name>, <Invocation Scheme>, and <Implicit Elements>.

<Service Class> is a class of service provided by the service processing device. As <Service Class>, <Service Class> which is defined in advance is used. <Service Class> corresponds to scanning, printing, repository, flow, or the like. <Service Name> is the name of a service provided by the service processing device. <Service Icon> is position information of an icon displayed on a Graphical User Interface (GUI) of the client terminal 10. <Service Info. Location> is a Uniform Resource Locator (URL) used when the instruction data generation server 30 acquires I/F information.

<Input> is an input to a service. <Output> is an output from a service. <Parameter Restriction Rules> is a restriction rule applied to <Input>. <Service Info. Location> is position information used when a service is actually used. In <Method Name>, a name indicating a method of providing a service process or a service is described.

<Invocation Scheme> is a scheme for calling a service process and invoking the service process. Note that, as <Invocation Scheme>, SOAP (Simple Object Access Protocol), SMTP (Simple Mail Transfer Protocol), and the like which are protocols for message exchange can be used. <Implicit Elements> is not data which is explicitly transferred to the subsequent process as output but is data which can be referred to in a subsequent process.

The client terminal 10 comprises the functions of a graphical user interface (GUI) for performing predetermined operations such as an operation of designating formulation of an instruction data, or a display operation for selecting an instruction data to be invoked.

The service retrieval server 20 retrieves a service corresponding to a retrieve condition from a plurality of services connected to the network 5. The service retrieval server 20 stores in advance a part of I/F information (to be referred to as "partial I/F information" hereinafter) of the various service processing devices such as the image processing apparatus 61, the document management server 62, the document delivery server 63, the first service processing device 64, and the second service processing device 65. The partial I/F information mentioned here corresponds to <Service Class>, <Service Name>, <Service Inf. Location>, <Input> information, and <Output> information.

The service retrieval server 20 retrieves a service by using the partial I/F information of the service processing devices when retrieving conditions are transmitted from the instruction data generation server 30 or the co-ordinating process server 50. For example, when the service retrieval server 20 retrieves the same service as the predetermined service, the service retrieval server 20 may retrieve a service having the same <Service Class> as that of the predetermined service, a service having the same <Input> and <Output> as those of the predetermined service, or a service having all the same pieces of information as those of the predetermined service.

The instruction data generation server 30 acquires pieces of I/F information from the service processing devices and generates an instruction data for co-ordinating services provided by the service processing devices. The instruction data generation server 30 executes the following process in detail to form an instruction data.

The instruction data generation server 30 requests predetermined service processing devices distributed on the network 5 to transmit pieces of I/F information related to the services on the basis of <Service Info. Location>. When there is no service processing device, the instruction data generation server 30 designates the service retrieval server 20 to retrieve another service processing device for performing the same service as that performed by the predetermined service processing device. The instruction data generation server 30 may acquire <Service Info. Location> of the other service processing device from the service retrieval server 20.

The instruction data generation server 30 manages a retrieval result from the service retrieval server 20 and the pieces of I/F information received from the service processing devices. The instruction data generation server 30 generates an Hyper Markup Language (HTML) file used as a GUI screen for defining a job flow on the basis of the pieces of I/F information acquired from the service processing devices. When the instruction data generation server 30 receives a request from the client terminal 10 to inspect a service, the instruction data generation server 30 transmits the HTML file used as the GUI screen to the client terminal 10.

In the client terminal 10, a job flow is defined by the GUI screen for defining a job flow.

The client terminal 10 transmits job flow information defined by an operation of the user to the instruction data generation server 30.

The instruction data generation server 30 forms an instruction data defining information for specifying a document to be processed such as the contents of processes requested to be performed by the services, input parameters, co-ordinating methods of the services (job flow), a document name, and storage location information on the basis of the job flow information related to the designation of service co-ordination by the user and the I/F information of each service. The instruction data is constituted by an XML format file.

FIG. 5 is a conceptual diagram showing the instruction data constituted in the XML format. Since a co-ordinating process of the plurality of services is considered as one service, the instruction data has a configuration in which <Flow> is added to the I/F information shown in FIG. 3.

<Flow> is an element, which describes correlation between services and includes <Invoke>, a control structure or a logic operation, an element such as <if> for deciding a condition, an operation designation of an XML structure for adjusting co-ordination between services, and information for specifying a document to be processed.

<Invoke> represents a specific method of the service processing device and executes calling of a service. Elements of <Invoke> include <Map> representing position information of a parameter and a method name <Method> to be called. <if>, <and>, <eq>, and <gt> representing a control structure, a logic operation, or the like perform conditional branching in a co-ordinating process or perform adjustment parameters transferred between services.

The instruction data describes all pieces of information related to control of the co-ordinating process of the services in the elements of <Flow>. In this manner, the co-ordinating process itself expressed by the instruction data is also considered as one service. The instruction data is not limited to the configuration shown in FIG. 5, and is satisfactory as long as it can perform co-ordination between services.

The instruction data generation server 30 transmits the above instruction data of the XML format to the instruction data management server 40. Moreover, the instruction data generation server 30 may directly transmit the instruction data to the co-ordinating process server 50 when the user designates a service co-ordinating process to be performed.

On the other hand, the instruction data management server 40 holds the instruction data transmitted from the instruction data generation server 30 and transmits the instruction data to the co-ordinating process server 50 in response to a request from the client terminal 10.

The co-ordinating process server 50 is a server for executing and interpreting the designated instruction data. When the instruction data is transmitted to the co-ordinating process server 50, the co-ordinating process server 50 interprets the instruction data and sequentially calls service processing devices such as the image processing apparatus 61, the document management server 62, and the document delivery server 63 according to an order and a usage method described in the instruction data, and executes a co-ordinating process. Moreover, the co-ordinating process server 50 stores a state of the co-ordinating process being executed and result information of co-ordinating processes completed and notifies the state or the results of the co-ordinating processes in response to external request.

When the co-ordinating process server 50 interprets the instruction data and requests the service processing devices to perform processes, the co-ordinating process server 50 generates individual pieces of information capable of specifying process request contents and documents to be processed. The co-ordinating process server 50 may extract relative information between various service processes in the co-ordinating process of the processes performed in the service processing devices and describe the relative information in the instruction data. The co-ordinating process server 50 may also perform process requests not in the format of the instruction data but in information exchange formats inherent in the service processing devices.

The image processing apparatus 61 is a computer in which a software program for performing an image processing function is installed. The image processing apparatus 61 processes a document on the basis of service process request contents included in the individual designation information from the co-ordinating process server 50 and the information contained in a document to be processed. The image processing apparatus 61 notifies the partial I/F information to the service retrieval server 20 at the time of invocation. Furthermore, the image processing apparatus 61 transmits I/F information representing a usage method of an image processing service by means of a request from the instruction data generation server 30. This I/F information is used at the time of the formulation of an instruction data.

The document management server 62 has a document storing function. The document management server 62 executes storage, retrieval, or reading of a document, a change in attribute related to the document, or various processes on the basis of the information included in the request from the co-ordinating process server 50.

The document management server 62 notifies the partial I/F information to the service retrieval server 20 at the time of invocation. In addition, the document management server 62 transmits the I/F information representing a usage method of a document management service by means of a request from the instruction data generation server 30.

The document delivery server 63 comprises a function of storing an acquired document in a designated document management server, a function of performing e-mail or facsimile transmission to a designated destination, a function of performing a print output process to a designated printer. The document delivery server 63 performs a document delivery process on the basis of a document designated by the client terminal 10 and information or a delivery destination of the document depending on the individual designation information from the co-ordinating process server 50. The document delivery server 63 notifies the partial I/F information to the service retrieval server 20 at the time of invocation. In addition, the document delivery server 63 transmits the I/F information representing a usage method of a delivery process service by means of a request from the instruction data generation server 30.

The first service processing device 64 is a device, which performs a predetermined service process related to a document according to an external designation. The first service processing device 64 executes a service process to be executed by the first service processing device 64 itself on the basis of information such as an input parameter included in individual designation information from the co-ordinating process server 50 or information for specifying a document to be processed.

The first service processing device 64 notifies the partial I/F information to the service retrieval server 20 at the time of invocation. In addition, the first service processing device 64 transmits the I/F information representing the usage method of the service process on the basis of a request from the instruction data generation server 30. The second service processing device 65 performs in the same fashion as the first service processing device 64 except with regard to the contents of the service process.

In the document processing system 1 constituted as described above, application programs for executing predetermined services are installed in service processing devices such as the image processing apparatus 61, the document management server 62, and the document delivery server 63 to operate as described below.

Service processing devices such as the image processing apparatus 61, the document management server 62, and the document delivery server 63 notify pieces of partial I/F information including pieces of information representing service outlines and addresses to the service retrieval server 20 in an invoking process.

The service retrieval server 20 stores the pieces of partial I/F information transmitted from service processing devices such as the image processing apparatus 61, the document management server 62, and the document delivery server 63. In this manner, the service retrieval server 20 can execute retrieval by using the partial I/F information when a predetermined service retrieving request is received from, e.g., the instruction data generation server 30 or the co-ordinating process server 50.

(Formulation of Instruction Data)

Figure 8:
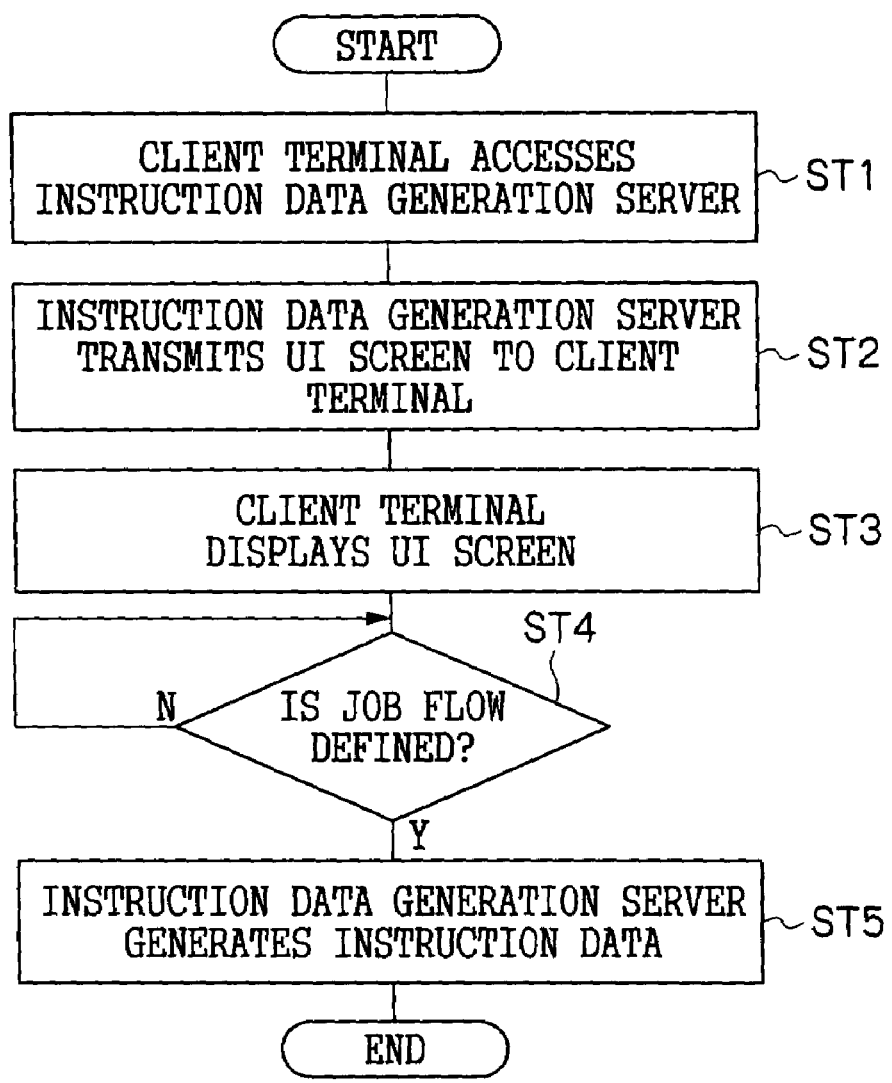
FIG. 8 is a flow chart showing procedures of a client terminal and an instruction data generation server in formation of an instruction data.

FIG. 8 is a flow chart showing procedures of the client terminal 10 and the instruction data generation server 30 in the formulation of an instruction data.

The client terminal 10 accesses the URL (Uniform Resource Locator) of an HTML file generated on the user interface screen provided by the instruction data generation server 30 in accordance with the operation of the user through an installed browser, (step ST1).

The instruction data generation server 30 transmits the HTML file of the user interface screen to the client terminal 10 in response to a browsing request from the client terminal 10 (step ST2).

The client terminal 10 displays the user interface screen on the basis of information which structures a screen included in, e.g., the HTML file transmitted from the instruction data generation server 30 (step ST3). At this time, the user can define a job flow of a desired service co-ordination by using the user interface screen displayed on the client terminal 10.

The client terminal 10 decides whether the job flow is defined through the user interface screen, and waits until the job flow is defined (step ST4). When it is determined that the job flow is defined, the client terminal 10 transmits job flow information related to the service co-ordination defined by the user to the instruction data generation server 30.

The instruction data generation server 30 forms an instruction data in which information for specifying a document to be processed such as the contents of processes requested to be performed by the services, a method of co-ordinating the services, a document name, and storage location information are defined on the basis of information related to the job flow of the service co-ordination transmitted from the client terminal 10 (step ST5) and the I/F information acquired from the service processing devices. The instruction data generation server 30 transmits the instruction data of the XML format to the instruction data management server 40.

The instruction data management server 40 stores the instruction data generated by the instruction data generation server 30. The instruction data management server 40 stores a plurality of instruction data formed by the instruction data generation server 30, and reads a selected instruction data when the client terminal 10 designates an instruction data to be selected.

(Invocation and Execution of Cooperating Process)

The user can select a desired instruction data from the plurality of instruction data stored in the instruction data management server 40, and can invoke the co-ordinating process. This operation will be described below in detail.

Figure 9:
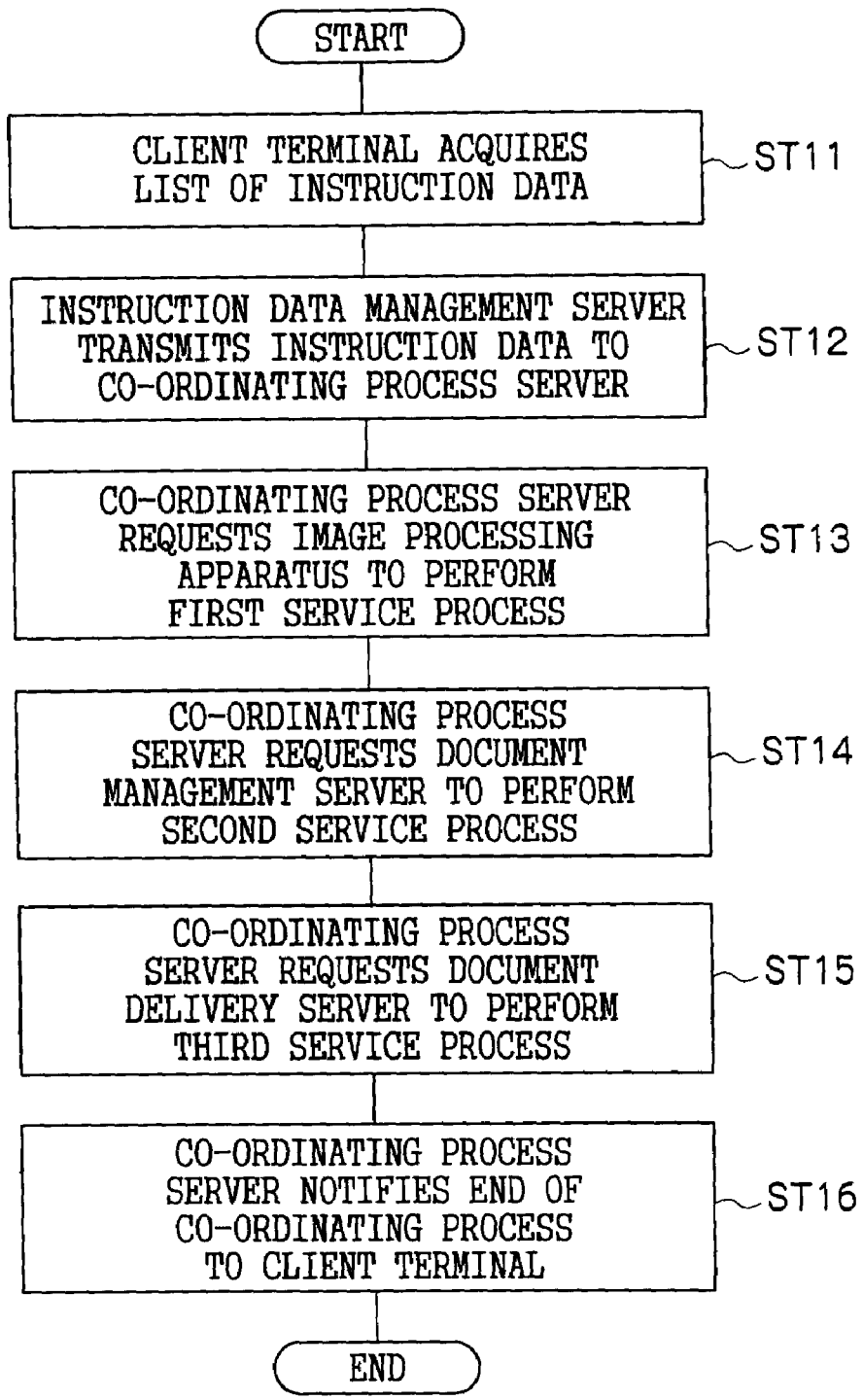
FIG. 9 is a flow chart showing a co-ordinative procedure.

FIG. 9 is a flow chart showing the processes of the client terminal 10, the instruction data management server 40, and the co-ordinating process server 50.

The client terminal 10 accesses the instruction data management server 40 to acquire a list of instruction data managed by the instruction data management server 40 (step ST11).

The client terminal 10 selects an instruction data expressing a predetermined service co-ordinating process from a service co-ordinating process selection screen on the basis of an operation designation of the user and designates the instruction data to be invoked. At this time, if necessary, a parameter input screen is displayed to the user, and an input of a parameter required for execution of the job is received.

The instruction data management server 40 transmits the instruction data designated by the client terminal 10 to the co-ordinating process server 50 (step ST12). As a result, the co-ordinating process server 50 starts execution of the co-ordinating process.

The co-ordinating process server 50 interprets the instruction data transmitted by the instruction data management server 40 and requests the image processing apparatus 61 which executes the first process described in the instruction data to execute the first service process (step ST13). More specifically, the co-ordinating process server 50 extracts a location of a service processing device requested to perform a process, an input parameter required for a process request, a method name for the process request, an invoking method, and information for specifying a document to be processed on the basis of the information described in the instruction data and formulates individual designation information. The co-ordinating process server 50 transmits the individual designation information to the image processing apparatus 61 which serves as a recipient of a first process request.

The image processing apparatus 61 copies the document to be processed on the basis of the storage location information of the document to be processed described in the individual designation information transmitted and acquires a document. The image processing apparatus 61 interprets the contents of the individual designation information for the acquired document image and performs image processing such as noise reduction or an OCR process to perform a binding process between the document image and an extracted text document. The image processing apparatus 61 stores again in the original storage location the document obtained by the binding at the image document obtained by the image processing with the text document. Upon completion of these processes, the image processing apparatus 61 transmits processing results such as status information of the processes (completion), output parameters, and storage location information of the processed document to the co-ordinating process server 50.

When the co-ordinating process server 50 receives the processing results from the image processing apparatus 61, the co-ordinating process server 50 logs and manages a first process request result. The co-ordinating process server 50 specifies a recipient of a second process request on the basis of the instruction data, and requests the document management server 62 to execute the second service process (step ST14). As with the first service process request, the co-ordinating process server 50 transmits to the document management server 62 individual designation information (information representing that a document serving as information related to a process request be stored, information about a document storage location, and information for specifying a document to be processed).

The document management server 62 performs a storing process of the document which has been processed and stored in the previous process (first service process) on the basis of the request contents of the co-ordinating process server 50 on the basis of storage location information described in the request contents of the co-ordinating process server 50. Upon completion of these processes, the document management server 62 transmits processing results such as status information of the process (completion), output parameters, and storage location information of the processed document to the co-ordinating process server 50.

When the co-ordinating process server 50 receives the processing results from the second service process (document storing process), the co-ordinating process server 50 logs and manages the second process request result. The co-ordinating process server 50 now specifies a recipient of a third process request on the basis of the instruction data, and requests the document delivery server 63 to execute a third service process (step ST15). As with the second service process request, the co-ordinating process server 50 transmits individual designation information (information representing that a document serving as information related to a process request be stored, information about a document storage location, and information for specifying a document to be processed) to the document delivery server 63.

The document delivery server 63 reads the document which has been processed and stored in the previous process (second service process) on the basis of the request contents of the co-ordinating process server 50, on the basis of information for specifying the document (storage location information), and performs a process described in the request contents. In this case, with the document obtained by binding the text document with the image document, the document delivery server 63 transmits only the text document to an e-mail address designated as a delivery destination for E-mail, and performs facsimile transmission of only the image document to a facsimile number. Upon completion of the process, the document delivery server 63 transmits processing results such as status information of the process (completion), output parameters, and storage location information of the processed document to the co-ordinating process server 50.

In this process, when, for example, the document delivery server 63 has been unable to access a destination in, e.g., a facsimile transmission process with a predetermined number of second attempts because the destination is engaged the document delivery server 63 transmits, "mail transmission: completion, facsimile transmission: untransmitted" as status information to the co-ordinating process server 50.

The co-ordinating process server 50 receives the processing results from the third service process, and determines that the next process is not described in the instruction data. In this case, the co-ordinating process server 50 notifies the client terminal 10 that all the processes have been completed, and terminates the co-ordinating process (step ST16).

In this embodiment, the service retrieval server 20 acquires a part of I/F information (partial I/F information) from the service processing devices. However, the invention is not limited to this configuration. For example, the service retrieval server 20 may acquire all the I/F information.

As described above, according to the document processing system 1 of this embodiment, a series of processes performed by service processing devices such as the image processing apparatus 61, the document management server 62, the document delivery server 63, the first service processing device 64, and the second service processing device 65 are defined by an instruction data, so that the series of processes can be executed in one simple operation.

On the other hand, when the image processing apparatus 61 comprises a display component such as a touch panel which displays a screen and accepts an operation input by the user, the user may need to be requested to input a designation of a change in image processing density or the like when image processing such as an OCR process executed by the image processing apparatus 61 on the basis of the individual designation information is received from the co-ordinating process server 50.

In such a case, a display screen depending on the display component arranged on the image processing apparatus 61 side must be provided.

Therefore, in this embodiment, the individual designation information transmitted from the co-ordinating process server 50 to the image processing apparatus 61 is transmitted together with user interface (to be referred to a UI hereinafter) information. The UI information is a generic term for information for requesting the user to perform outputting (screen display) or inputting of the pieces of information constituting the I/F information (see FIG. 3) described above. For example, the UI information corresponds to <Input>, <Output>, and <Parameter Restriction Rules> constituting the I/F information (which will be described in detail later).

In this embodiment, the image processing apparatus 61 comprises co-ordinating process functions, which perform designation inputting, and screen display for the user and which reflect designated and input parameters on the instruction data to request invocation of a co-ordinating process.

In this embodiment, of the co-ordinating process functions, a display process function component for designating and inputting parameters and displaying a screen for the user will be described below.

FIG. 7 shows an example of a block diagram showing a display process function component 69.

The image processing apparatus 61 includes a microcomputer constituted by a CPU, a ROM, and a RAM, and comprises the display process function component 69. The display process function component 69 is constituted by a display control component 70 and the display processing component 72. The display control component 70 is constituted by an instruction data acquisition component 74, an instruction data storage component 76, and an instruction data interpreting component 78. The display processing component 72 is constituted by a display contents interpreting component 80, a display image generation component 82, a display component 84 such as an LCD or a CRT, the user information control component 86, a display information control component 88, an input information control component 90, and an input information storage component 92. The above-mentioned instruction data acquisition component 74, the instruction data storage component 76, the instruction data interpreting component 78, the display contents interpreting component 80, the display image generation component 82, the display component 84, the user information control component 86, the display information control component 88, the input information control component 90 and the input information storage component 92 are connected to a microcomputer and can exchange data with each other.

The instruction data acquisition component 74 is connected to the network 5 and acquires individual designation information from the co-ordinating process server 50. The instruction data storage component 76 stores the acquired individual designation information. The instruction data interpreting component 78 interprets the individual designation information acquired by the instruction data acquisition component 74, extracts a UI information part included in the individual designation information, and outputs the UI information part to the display processing component 72.

The display contents interpreting component 80 interprets the UI information output from the instruction data interpreting component 78 and outputs an interpretation result to the display image generation component 82. The display image generation component 82 generates screen information of a display screen displayed on the display component 84. When the interpretation result output from the display contents interpreting component 80 includes a reference location information of the screen information, the display image generation component 82 can also acquire screen information depending on the reference location information from the outside. As an example of the reference location information, a Uniform Resource Locator (URL) or the like representing a reference location is known.

This embodiment will describe a case in which image information of the HTML format has been stored in the document management server 62 in advance. As the format of the image information stored in the document management server 62, not only the HTML format but also various formats such as the BINARY format or the XML format can be used.

The display component 84 displays a display screen of screen information, accepts an operation input obtained by the user through the display screen, and has a touch panel function.

The user information control component 86 stores in advance authorization information of the user using the image processing apparatus 61, compares the authorization information stored in advance with authorization information included in UI information interpreted in the interpretation of UI information (to be described later), and outputs a comparison result to the display contents interpreting component 80.

This authorization information is classified by an element common in arbitrary users among a plurality of users who use service processing devices including the image processing apparatus 61. The user belongs to a community such as a corporation or a school, and the community is variously classified by sections to which the community corresponds, by responsibility, or by the like. In this embodiment, it is assumed that ID numbers such as employee numbers by which users can be identified are given to the users in advance, respectively. It is also assumed that the authorizations depending on the input ID numbers are stored in the image processing apparatus 61 such that the authorizations are related to the ID numbers in advance, respectively. It is also assumed that when an ID number is input by the user through the display component 84, authorization information depending on the input ID number is stored in the user information control component 86 in advance. Further, the ID number of the user may be input through the display component 84 at the time of invocation of the image processing apparatus 61 and at the time of acquisition of individual designation information acquired by the instruction data acquisition component 74.

The display information control component 88 controls restrictions on display of parameters displayed on the display component 84 depending on the interpretation results of the UI information interpreted by the display contents interpreting component 80.

The input information control component 90 controls restrictions on parameters input through the display component 84 depending on the interpretation results of the display contents interpreting component 80.

The input information storage component 92 stores the parameters input through the display component 84.

The instruction data acquisition component 74 corresponds to the acquisition component according to the invention, and the display component 84 corresponds to the display component and the input component. The display information control component 88 corresponds to the designation component according to the invention, and the display image generation component 82 corresponds to the display information control component. The setting information storage component corresponds to the input information storage component 92. The input information control component 90 corresponds to the evaluation component and the change component.

In this embodiment, it is assumed that the UI information is stored in the instruction data generation server 30 in advance. It may also be assumed that the UI information is stored in service processing devices such as the image processing apparatus 61 and the document management server 62.

Figure 4:
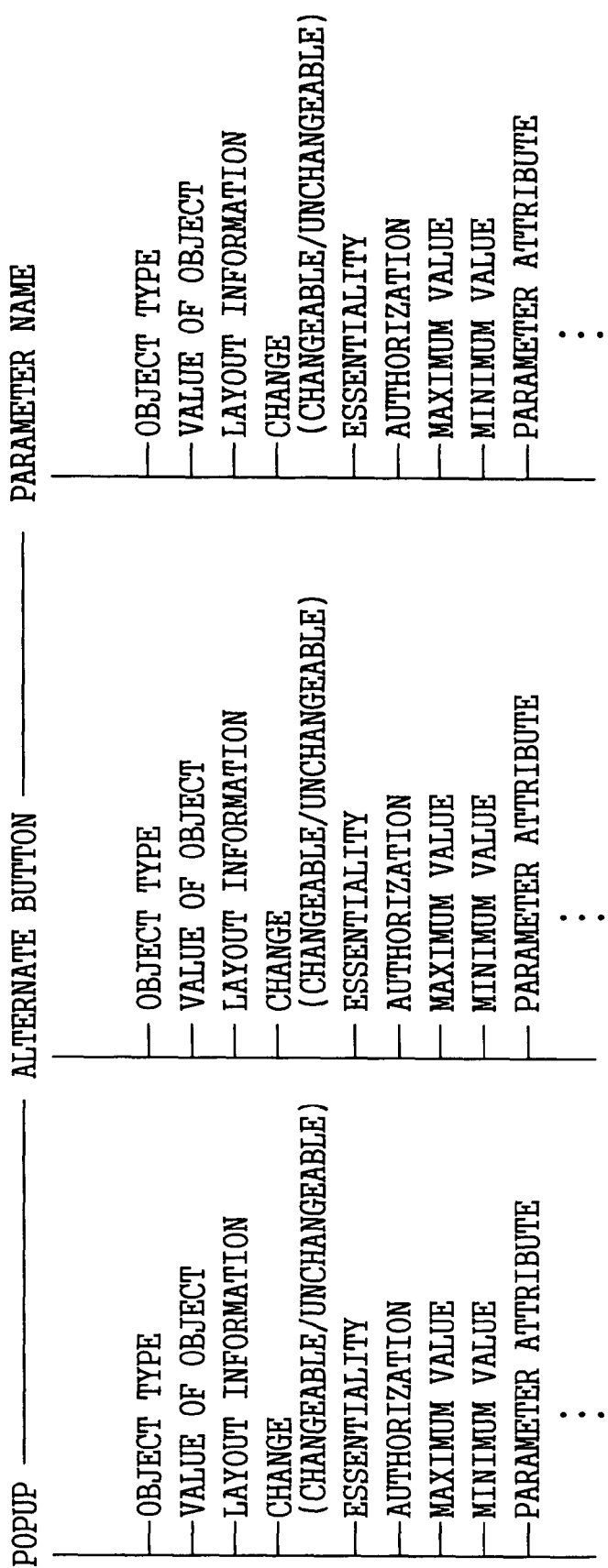
FIG. 4 is an image diagram showing user interface (UI) information.

FIG. 4 is an image diagram showing the configuration of the UI information. The UI information is constituted by pieces of item information serving as parameters representing objects to be displayed. As pieces of item information, for example, <Popup>, <Alternate Button>, <Parameter Name>, and the like are used. The parameters, i.e., the pieces of item information are constituted by including pieces of attribute information. For example, as shown in FIG. 4, the pieces of attribute information are tree-structured in units of pieces of item information. The attribute information is used to control generation of a screen structure for displaying the pieces of item information on a screen, values displayed on a screen, and values to be input. The attribute information represents information or the like representing a position and a shape for screen display, a value to be displayed, display, and input control.

As pieces of attribute information, <Object Type>, <Value of Object>, <Layout Information>, <Change>, <Necessity>, <Authorization>, <Maximum Value>, <Minimum Value>, <Parameter Attribute>, and the like are known. <Object Type> represents a process performed such that item information to be displayed on a screen is designated by the user through the display component 84. <Value of Object> is a value of item information such as a string of character displayed on a screen. <Layout Information> represents relative position coordinates on the display screen of item information displayed on a screen.

<Change> represents whether or not a value of item information can be changed by a designation input of the user. As <Change>, attribute information representing changeable or unchangeable is displayed. <Necessity> represents whether or not corresponding item information is item information, which must be input by the user. <Authorization> represents an authorization held by item information. With regard to the values of the item information, <Maximum Value> represents the maximum value of values, which can be input through the display component 84, and <Minimum Value> represents the minimum value of values, which can be input through the display component 84. <Parameter Attribute> represents a type of value to be input in the item information through the display component 84.

The pieces of attribute information for the pieces of item information are not limited to <Object Type>, <Value of Object>, <Layout Information>, <Change>, <Necessity>, <Authorization>, <Maximum Value>, <Minimum Value>, and <Parameter Attribute> described above. The pieces of attribute information can also be constituted by further pieces of attribute information. For example, the pieces of attribute information can further include pieces of attribute information such as <Number of Objects> representing the number of pieces of item information, <Initial Setting Value> representing an initial setting value, and the like. In addition, and in contrast, the attribute information can be constituted by only one of the pieces of attribute information.

In this embodiment, the image diagram showing the configuration of the UI information has a tree structure for descriptive convenience. However, the configuration according to the invention is not limited to such a tree structure.

FIG. 6 shows an example of UI information included in an instruction data having an XML format configuration. The UI information included in the instruction data is described between <UI> representing the start position of the UI information and the end position </UI> of the UI information.

In the UI information shown in FIG. 6, as pieces of item information displayed on a screen, <Popup>, <Button>, and <Text> are shown. As the attribute information of <Popup>, "magnification selection" is shown as the value of an object.

As the attribute information of <Button>, "close" is shown as the value of an object. As the object type, "close" is shown as an object type, and an X-coordinate value "700" and a Y-coordinate value "5" are shown.

As the attribute information of <Text>, "text" is shown as an object type, and "25 to 400" is shown as the value of an object. As layout information, an X-coordinate value "220" and a Y-coordinate value "150" are shown.

Furthermore, in the attribute information of the lower <Text>, "text" is shown as an object type, and "%" is shown as the value of an object. As the layout information, an X-coordinate value "350" and a Y-coordinate value "220" are shown as layout information.

Still furthermore, in the attribute information of the lower <Text>, "numeric" representing a character input column is shown as an object type, and "true" representing that the item information can be set for the user, and "black" representing that a display section of the item information is highlighted are also shown. As layout information, an X-coordinate value "220" and a Y-coordinate value "200" are shown. "25 is shown as the minimum value, and "400" is shown as the maximum value.

The item information and the attribute information described in the UI information may be determined as follows. For example, predetermined values are prepared in advance in the instruction data generation server 30, and the item information and the attribute information are determined on the basis of the predetermined values thus prepared.

(Screen Display Method in Image Processing Apparatus 61)

Figure 10:
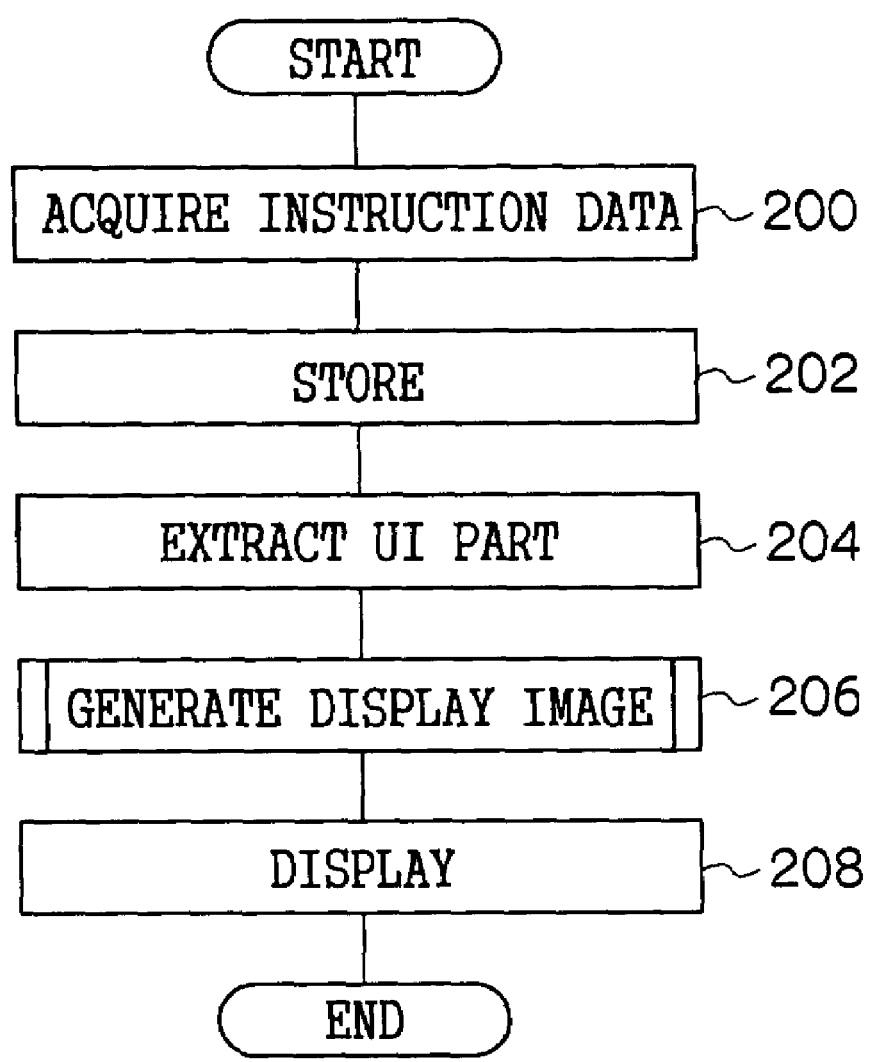
FIG. 10 is a flow chart showing an image display process.

A display process executed in the image processing apparatus 61 in step ST13 (FIG. 9) will be described below with reference to FIG. 10.

In the image processing apparatus 61, in step 200, individual designation information is acquired from the co-ordinating process server 50 by the instruction data acquisition component 74. In the next step 202, the acquired individual designation information is stored in the instruction data storage component 76.

In the next step 204, UI information included in the individual designation information is extracted. The process in step 204 is performed such that the individual designation information is read from the instruction data storage component 76 and information described between <UI> representing the start position of the UI information included in the individual designation information and the end position </UI> of the UI information is read in the instruction data interpreting component 78. The UI information extracted by the process in step 204 is output to the display contents interpreting component 80.

In the next step 206, depending on the UI information extracted in step 204, screen information of a display screen which can be displayed on the display component 84 and input/output to the user is generated by the display image generation component 82 (to be described later). Thereafter, the procedure proceeds to step 208.

In step 208, after the screen information generated in step 206 is displayed on the display component 84, the main routine is terminated.

(Display Image Generation Process)

Figure 11:
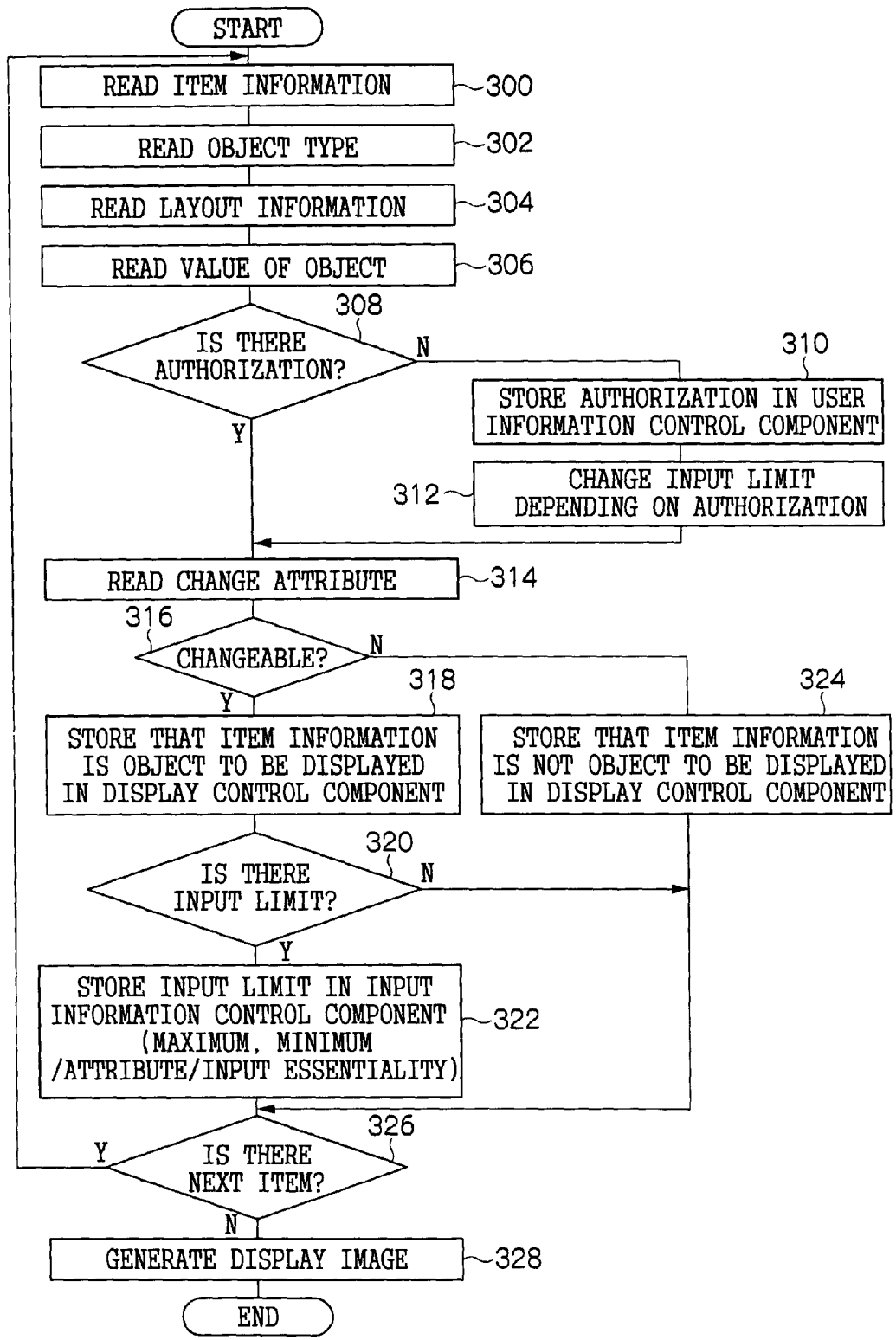
FIG. 11 is a flow chart showing a display image generation process.

An image information generation process in step 206 will next be described below with reference to FIG. 11.

In step 300, a process of reading item information included in the UI information is executed. By means of the process in step 300, the item information described on the previous stage of the UI information is read.

In the next step 302, a process of reading an object type of the item information read in step 300 is executed. By means of the process in step 302, among item information read in step 300, a process is performed such that item information, which is displayed on the screen, is designated by the user and read.

In the next step 304, a process of reading layout information of the item information read in step 300 is executed. By means of the process in step 304, among the item information relative position coordinates, which are displayed on the screen of the display component 84, are read.

In step 306, a process of reading the value of objects of the item information read in step 300 is executed. By means of the process in step 306, a value of the item information read in step 300, is displayed on the screen, and read.

In the next step 308, a determination is made whether or not <Authorization> is described as attribute information of the item information read in step 300. When the determination is negative in step 308, the procedure proceeds to step 314. When the determination is positive in step 308, the procedure proceeds to step 310.

In step 310, after the image information read in step 300 and the authorization information of the item information are stored in the user information control component 86 such that the image information is related to the authorization information, a comparison process of comparing the authorization information with the authorization information stored in advance in the user information control component 86 is undertaken. Thereafter, the comparison results are output to the display contents interpreting component 80. In the next step 312, a change process of changing the value of predetermined attribute information included in the UI information is executed depending on the comparison results input into the display contents interpreting component 80.

By means of the process in step 312, values shown in pieces of attribute information, e.g., <Maximum Value>, <Minimum Value>, <Necessity>, and <Change>, for pieces of item information included in the UI information and read in step 300 are changed. It is assumed that the pieces of attribute information and the values, which have been changed by the attribute information changing process in step 312, are determined on the basis of authorizations in advance. More specifically, "Administrator" is described in <Authorization> of the UI information. When the authorization information stored in advance in the user information control component 86 is "Administrator", the display contents interpreting component 80 changes a value shown in <Maximum Value> such that the value increases, or changes a value shown in <Change> from an unchangeable value to a changeable value, thus changing the UI information.

For this reason, depending on the type of authorization the user using the image processing apparatus 61 corresponds to, the value of the attribute information described in the UI information can be changed.

In the next step 314, a process of reading a change attribute of the attribute information of the item information read in step 300 is executed.

In step 314, it is determined whether or not the <Change> attribute is described in the attribute information of the item information reading in step 300 immediately before the change attribute read process instep 314. When the <Change> attribute is not described, the procedure proceeds to step 318. When the <Change> attribute is described, the procedure proceeds to step 314.

In the next step 316, it is determined whether or not a value representing changeable is described in the change attribute read in step 314. When the determination is positive in step 316, the procedure proceeds to step 318 and stores the item information read in step 300 as well as information representing that the item information is an object to be displayed on the display component 84 in the display information control component 88 such that the item information and the information are related to each other. Thereafter, the information is output to the display image generation component 82 and the procedure then moves on to step 320.

When the determination is negative in step 316, the procedure proceeds to step 324 and stores the item information read in step 300 and information representing that the item information is not an object to be displayed on the display component 84 in the display information control component 88 such that the item information and the information are related to each other. Thereafter, the information is output to the display image generation component 82 and the procedure then moves on to step 326.

This embodiment explains the case in which information representing whether or not the item information is an object to be displayed depends on a result obtained by deciding whether or not a value representing changeable are described in the change attribute in step 316 is output from the display information control component 88 to the display image generation component 82 such that the information is related to the item information. However, the invention is not limited to these processes. For example, when a change attribute represents unchangeable, image information transmitting a message representing that the item information is unchangeable may be stored such that the image information is related to the item information. Image information representing a display color may be stored such that the image information is related to the item information to display the item information in a color different from that of changeable item information. Furthermore, prohibition information representing prohibition of inputting may be stored in the item information such that the prohibition information is related to the item information.

In the next step 320, it is determined whether an input limit is described as attribute information or not. The decision in step 320 can be made by deciding whether or not the item information read in step 300 includes a value representing <Maximum>, <Minimum>, <Parameter Attribute>, or <Necessity>.

When the determination is negative in step 320, the procedure proceeds to step 326. When the determination is positive in step 320, the procedure proceeds to step 322. In step 322, the item information serving as the parameters read in step 300 and information representing an input limit of the item information are stored in the input information control component 90 such that the item information is related to the information. Thereafter, the information is output to the display image generation component 82, and the procedure proceeds to step 326. By means of the process in step 322, it can be evaluated by the input information control component 90 whether or not the value of the item value input through the display component 84 falls within the input limit described as the attribute information of the item information.

In step 326, it is determined whether or not additional item information is further described on the subsequent stage of the item information read in step 300. When the determination is positive in step 326, the procedure returns to step 300. The processes in steps 300 to 308 are repeated until the determination becomes negative in step 326.

This embodiment has explained cases in which attribute information such as object types, layout information, values of objects, authorization, change, and input limits are read in the processes in steps 302 to 308, step 314, and step 320 as a process of reading the attribute information of the item information read in step 300. However, a process of reading different attribute information can also be executed. In this case, upon completion of the process in step 322, it is determined whether the attribute information of the item information read in step 300 is further included or not. When the determination is positive, the attribute information may be further read.

Any one of the processes in steps 302 to 308, step 314, and step 322 may be executed. In this case, immediately before the processes in steps 302 to 308 and step 314 are executed, it may be determined whether or not the respective pieces of attribute information are included in the item information read in step 300. For example, immediately before the process in step 302, it is determined whether or not an object type belonging to the item information read in step 300 is shown. When the determination is positive, the procedure proceeds to step 302. When the determination is negative, it is determined whether or not layout information is shown immediately before the next step 304, and the same processes as described above may be executed.

When the processes in steps 300 to 326 are repeated, the pieces of item information and the pieces of attribute information shown in the UI information are sequentially interpreted by the display contents interpreting component 80, and constraint information on a display of the pieces of item information and constraint information of an input value input through the display component 84 of the displayed pieces of item information are stored in the display information control component 88 and the input information control component 90, respectively.

In the next step 328, a screen information generation process is executed. Screen information is generated in the following manner. That is, a screen structure representing the display positions and shapes of the pieces of item information displayed on the display component 84 is generated depending on the pieces of item information obtained by the processes in steps 300 to 326, pieces of attribute information for the pieces of item information, pieces of constraint information in the displays of the pieces of item information, and constraint information of an input value input through the display component 84, and values to be displayed on the generated screen structure and display control and input control of the respective values are reflected.

More specifically, display patterns such as buttons corresponding to the pieces of item information and having shapes related to the pieces of item information or character input columns are formed from the pieces of item information, and the display positions of the pieces of item information of the formed display patterns are recognized, so that a screen structure is generated. Further, a process performed by selecting item information on the basis of an object type by an operation input by the user through the display component 84 is recognized, and a value to be displayed is recognized on the basis of the value of an object and reflected on the above-described generated screen structure.

With respect to the value to be displayed, it is recognized on the basis of a change attribute output from the display information control component 88 whether or not the value to be displayed is displayed, and an input limit value of an item requested to be input by the user is recognized on the basis of pieces of attribute information representing input limits such as <Maximum>, <Minimum>, <Attribute>, and <Necessity> output from the input information control component 90. These recognized pieces of information are reflected on the screen structure, so that screen information is generated.

In this embodiment, it is assumed that display specifications of the display component 84 such as the size of the display component 84 and the number of colors which can be displayed are stored in the image processing apparatus 61, and the display specifications are reflected in generation of screen information in step 328.

The screen information generated in step 328 is displayed on the display component 84 in step 208.

For this reason, depending on a determination result obtained by determining whether a value representing changeable is described in the change attribute in step 316, information representing whether or not the item information is an object to be displayed in the processes in steps 318 to 324, is output from the display information control component 88 to the display image generation component 82 such that the information is related to the item information, item information having attribute information representing unchangeable not being displayed on the display component 84 in step 328.

Further, when the change attribute represents unchangeable, and when image information representing a message representing the item information is unchangeable is output from the display information control component 88 to the display image generation component 82 such that the information is related to the item information, the item information having the attribute information representing unchangeable is displayed in step 328 on the display component 84 such that the image information representing unchangeable is added to the item information.

Furthermore, when the change attribute represents unchangeable, and when image information representing a display color which displays the display color of the item information in a color different from that of changeable item information is output from the display information control component 88 to the display image generation component 82 such that the image information is related to the item information, the item information having attribute information representing unchangeable is displayed in step 328 in a display color different from that of item information having attribute information representing changeable on the display component 84.

Moreover, when the change attribute represents unchangeable, and when prohibition information representing prohibition of inputting is output from the display information control component 88 to the display image generation component 82 such that the prohibition information is related to the item information, the item information displayed on the display component 84 is displayed such that the item information cannot be input through the display component 84.

For example, when the UI information shown in FIG. 6 is read by the processes in steps 300 to 310, a process of reading pieces of item information <Popup>, <Button>, and <Text> and the pieces of attribute information for the pieces of item information is executed, such as appears on the display screen shown in FIG. 12. More specifically, as shown in FIG. 12, "magnification selection" is displayed as a text on the display screen, and "close" button is displayed at a position indicated by X-coordinate 700 and Y-coordinate 5. In addition, "(25 to 400)" is displayed as a text at a position on the display screen indicated by X-coordinate 220 and Y-coordinate 150. Furthermore, "%" is displayed as a text at a position on the display screen indicated by X-coordinate 350 and Y-coordinate 220.

Further a number input column is displayed at a position on the display screen indicated by X-coordinate 220 and Y-coordinate 200 such that the number input column can be changed by the user.

(Input to Display Screen)

Operation inputting is performed by the user through screen information displayed on the display component 84 and will be described below.

When a value representing, e.g., "500" is input by the user in a number input column 96 of the display screen shown in FIG. 12, the value representing "500" is input to the input information control component 90. As for the input information control component 90, the input value is constrained in step 322 depending on an input limit stored in the input information control component 90.

For example, the maximum value and the minimum value of the values numerically input in the number input column 96 are 40 and 25, respectively. It is determined whether or not the row of numerical values input falls within the range of from the maximum value to the minimum value. The input information control component 90 controls the display image generation component 82 such that, for example, display of "error" is performed on the display component 84. In this manner, image information representing error information prepared in advance is displayed on the display component 84.

In contrast to this, when a value representing "100" is input by the user in the number input column 96, the value representing "100" is input to the input information control component 90. Similarly, when an input constraint process is performed by the input information control component 90 causing an input value to fall within a range represented by attribute information, the input value is stored in the input information storage component 92.

When the value stored in the input information storage component 92 is registered as an initial value in, e.g., the individual designation information stored in the instruction data storage component 76, an input value in the subsequent image processing in the image processing apparatus 61 is displayed on the display component 84, and image processing (service process) can be executed by the input value.

As described above, in the image processing apparatus according to this embodiment, on the basis of UI information described in an instruction data, screen information can be operationally input and displayed on a screen for the user, and the screen information can be displayed on the display component 84.

Furthermore, depending on parameters (item information) shown in the UI information and pieces of attribute information held by the parameters, the display patterns and operation input patterns of the pieces of item information displayed on the display component 84 can be changed.

More specifically, when item information include attribute information representing that the item information is unchangeable, the item information having the attribute information representing unchangeable can be prevented from being displayed on the display component 84. Similarly, the item information having the attribute information representing unchangeable can be controlled such that the item information is displayed to include image information representing unchangeable. Furthermore, the display color of item information the change attribute of, which is changeable, can also be made different from the display color of item information the change attribute of, which is unchangeable. In addition, when the change attribute represents unchangeable, item information displayed on the display component 84 can also be displayed such that the item information cannot be input through the display component 84.

The value of attribute information described in the UI information can be changed on the basis of an authorization belonging in advance to a user of the image processing apparatus 61.

Thus, since a display image having a display pattern and an input pattern which depend on pieces of attribute information of the pieces for item information described in the UI information included in the instruction data can be displayed on the display component 84, an operation screen having expandability and versatility can be provided.

This embodiment has described the case in which a screen information generation process of a display screen depending on the UI information is performed by the image processing apparatus 61. However, even in service processing devices such as the document management server 62, the document delivery server 63, the first service processing device 64, and the second service processing device 65 which constitute the document processing system 1, processes can be executed by the same process routine as described above.

In these cases, the same functions as the function of the display process function component 69 are arranged in service processing devices such as the document management server 62, the document delivery server 63, the first service processing device 64, and the second service processing device 65, so that the UI information maybe included in the individual designation information transmitted from the co-ordinating process server 50.

In this way, in service processing devices such as the document management server 62, the document delivery server 63, the first service processing device 64, and the second service processing device 65 which constitute the document processing system 1, display screens depending on the UI information can also be displayed in the same manner.

As described above, with regard to each service processing device, a display screen need not be installed in advance, and display screens depending on the functions of the services are dynamically generated on the basis of the instruction data. For this reason, display screens having excellent expandability and versatility can be provided.

Moreover, since image information based on the specifications of the display screens installed in the service processing devices can be formed depending on the UI information, display screens in accordance with the display units of the service processing devices can be provided.

Each of the above embodiments has described a case in which the invention has been applied to the document processing system 1 which executes a series of processes described in an instruction data by delegating different processes using the co-ordinating process server 50 and is performed by a plurality of service processing devices connected to each other through a network. However, the invention is not limited to these cases. For example, the invention can also be applied to a document processing system, which executes the processes described in the instruction data without using the co-ordinating process server 50. This feature will be described below with reference to drawings. In the following description, the same reference numerals as in the above embodiments denote the same parts, and a description thereof will be omitted.

FIG. 13 is a block diagram for explaining interrelation between service processing devices constituting a document processing system 100. The document processing system 100 can execute a co-ordinating process of a plurality of services without using the co-ordinating process server 50 shown in FIGS. 1 and 2.

(Invocation and Execution of Cooperating Process)

The user can select a desired instruction data from a plurality of instruction data stored in the instruction data management server 40, and can invoke a co-ordinating process. This operation will be described below in detail.

The client terminal 10 selects an instruction data expressing a desired service co-ordinating process from a service co-ordinating process selection screen depending on an operation of the user, and designates the instruction data to be invoked. The instruction data management server 40 transmits the instruction data designated by the client terminal 10 to the image processing apparatus 61.

The image processing apparatus 61 acquires a document to be processed on the basis of storage location information of a document to be processed described in the transmitted instruction data. The image processing apparatus 61 interprets service process request contents with respect to the acquired document image, performs image processing such as noise reduction or an OCR process, and performs a process of binding the document image with an extracted text document. The image processing apparatus 61 interprets UI information included in the instruction data and displays on the display component 84 a display image in accordance with the UI information. Upon completion of the predetermined image processing, the image processing apparatus 61 deletes a service process request described in the instruction data. The image processing apparatus 61 transmits a document obtained by binding an image document obtained by image processing with a text document and an instruction data containing processing results such as status information of the process (completion), output parameters, and processed document storage location information to the document management server 62 for providing the next service process.

After the predetermined image processing is terminated, the image processing apparatus 61 may correct or delete part of a service request of the image processing apparatus 61 described in the instruction data and can transmit the document to the document management server 62. In addition, the image processing apparatus 61 can be structured to transmit the instruction data to the next service processing device, after the image processing is terminated.

The document management server 62 temporarily stores the document transmitted from the image processing apparatus 61 in the storage location described in the instruction data. The document management server 62 deletes the service process request described in the instruction data, and transmits the document and the instruction data to the document delivery server 63 for performing the next service process.

On the basis of the instruction data, the document delivery server 63 performs e-mail transmission for only a text document of a document obtained by binding a text document with an image document to an e-mail address designated as a delivery destination, and performs facsimile transmission for only the image document to a designated facsimile number. When the document delivery server 63 determines that the next process is not described in the instruction data, the document delivery server 63 notifies the client terminal 10 that all the processes have been completed and terminates the co-ordinating process.

A plurality of service processing devices for executing the services in the document processing system 100 which do not use the co-ordinating process server 50 described above or the document processing system 1 which uses the co-ordinating process server 50 can also be applied to a complex machine which is constituted as an independent machine without a network.

When the invention is applied to the document processing system 100 or the complex machine, the same effects as in the above embodiments can be obtained.

What is claimed is:

1. An image processing apparatus comprising:

an acquisition component that communicates over a network with a device that is a server, which controls a plurality of processing devices including the image processing apparatus so that a series of processes are applied to document data by the processing devices, the acquisition component acquiring an instruction from the device, the instruction instructing the image processing apparatus to process the document data by performing a first process included in the series of processes and including setting information specifying a setting to be applied to the first process;

a display component that displays screen information as a display pattern which is user changeable based on the instruction;

a designation component that, when the setting information included in the instruction has an attribute representing that changing of the setting information by a user is restricted, designates a display pattern of the setting information having the attribute as a display pattern different from the display pattern which is user changeable; and a display information control component that controls the display component to display the screen information in accordance with the display pattern that is different from the display pattern which is user changeable.

2. The image processing apparatus of claim 1, wherein the designation component designates a display pattern in which the setting information is not displayed.

3. The image processing apparatus of claim 1, wherein the designation component designates as the display pattern a pattern in which image information representing that the setting information is unchangeable is added.

4. The image processing apparatus of claim 1, wherein the designation component designates as the display pattern a pattern in which the setting information is fixed.

5. The image processing apparatus of claim 1, wherein, when a usage authorization is set in the setting information included in the instruction, the designation component designates the display pattern on the basis of the usage authorization.

6. The image processing apparatus according to claim 1, wherein the first process includes at least one of a noise reduction process of an image included in the document data, an image rotation process of the image, an Optical Character Recognition (OCR) process of the image, and an image binding process of the image.

7. The image processing apparatus according to claim 1, further comprising a transmission component that transmits over the network to the device a result of the first process being processed according to the setting information set by a user operating the operation screen.

8. The image processing apparatus according to claim 1, wherein the setting information includes a setting item and a setting value corresponding to the setting item to be set by the user.

9. The image processing apparatus according to claim 1, wherein the series of processes comprises at least two of a copying process, a printing process, a scanning process, a facsimile transmitting process, a facsimile receiving process, an e-mail deliver operation process, a storing in a repository process, a reading from the repository operation, an OCR (Optical Character Recognition) process of an image, and a noise reduction process of an image.

10. The image processing apparatus according to claim 1,
wherein the series of processes includes a second process to be processed by a processing device different from the image processing apparatus, and
the processing device applies the second process to the document data after the image processing apparatus applies the first process to the document data under the control of the server.

11. The image processing apparatus according to claim 10,
wherein the first and second processes are different types of processes, and
each of the first and second processes includes at least one of a copying process, a printing process, a scanning process, a facsimile transmitting/receiving process, an e-mail deliver operation process, a storing in a repository process, a reading from the repository operation, an OCR (Optical Character Recognition) process of an image, and a noise reduction process of an image.

12. The image processing apparatus according to claim 1,
wherein the instruction is constituted by an XML format file and
the attribute representing that changing of the setting information is restricted is specified in the XML formal file.

13. The image processing apparatus according to claim 12,
further comprising a judging component that judges whether or not the attribute representing that changing of the setting information is restricted is specified in the XML format file.

14. The image processing apparatus according to claim 1, further comprising a processing component that executes the first process to the document data based on screen information changed by a user through the display component.

15. An image processing apparatus comprising:
an acquisition component that communicates over a network with a device that is a server, which controls a plurality of processing devices including the image processing apparatus so that a series of processes are applied to document data by the processing devices, the acquisition component acquiring an instruction from the device, the instruction instructing the image processing apparatus to process the document data by performing a first process included in the series of processes and including setting information specifying a setting to be applied to the first process;
a display component that displays screen information as a display pattern which is user changeable based on the instruction;
an input component for inputting the setting information; and
an evaluation component for evaluating, when setting information included in the instruction has an attribute representing that the setting information is user changeable, the setting information input by the input component on the basis of the attribute.

16. The image processing apparatus of claim 15, wherein the evaluation component evaluates, when an inputtable range of the setting information is expressed as the attribute, whether an input value of the setting information obtained by the input component falls within the inputtable range.

17. The image processing apparatus of claim 15, wherein the evaluation component evaluates, when input essentiality of the setting information is expressed as the attribute, whether inputting of the setting information is performed by the input component.

18. The image processing apparatus of claim 15, wherein the evaluation component evaluates, when an input character type of the setting information is expressed as the attribute, whether an input value of the setting information obtained by the input component is the input character type.

19. The input processing apparatus of claim 15, wherein the display component further displays an evaluation result obtained by the evaluation component.

20. The image processing apparatus of claim 15, further comprising a change component for changing input setting information to predetermined setting information when an evaluation result obtained by the evaluation component is evaluated to be incorrect.

21. The image processing apparatus of claim 15, further comprising a setting information storage component for storing setting information input by the input component, wherein, when the next screen is displayed, the setting information stored in the setting information storage component is used.

22. An image processing method which can acquire, by communication over a network, an instruction from a device that is a server, which controls a plurality of processing devices including an image processing apparatus so that a series of processes are applied to document data by the processing devices, the instruction instructing the image processing apparatus to process the document data by performing a first process included in the series of processes and including setting information specifying a setting to be applied to the first process, the image processing method comprising the steps of:
displaying a screen on the basis of screen information as a display pattern which is user changeable based on the instruction from the server;
designating, when the setting information included in the instruction from the server has an attribute representing that changing of the setting information by a user is restricted, as a display pattern of the setting information having the attribute a display pattern different from the display pattern which is user changeable; and
outputting screen information for displaying the setting information in accordance with the display pattern.

23. An image processing method which can acquire, by communication over a network, an instruction from a device that is a server, which controls a plurality of processing devices including an image processing apparatus so that a series of processes to be applied to document data by the processing devices, the instruction instructing the image processing apparatus to process the document data by performing a first process included in the series of processes and including setting information specifying a setting to be applied to the first process, the image processing method comprising the steps of:

displaying a screen on the basis of screen information as a display pattern which is user changeable based on the instruction from the server;

inputting the setting information; and evaluating, when setting information included in the instruction from the server has an attribute representing that the setting information is user changeable, the input setting information on the basis of the attribute.

24. An image processing apparatus comprising:

an acquisition component that communicates over a network with a device that is a server, which controls a plurality of processing devices including the image processing apparatus so that a series of processes are applied to document data by the processing devices, the acquisition component acquiring an instruction from the device, the instruction instructing the image processing apparatus to process the document data by performing a first process included in the series of processes and including setting information specifying a setting to be applied to the first process;

an interpreting component that interprets the instruction and that determines whether changing of the setting information by a user is restricted or not;

a designation component that designates a display pattern of the setting information as a display pattern that is user-changeable when changing of the setting information by a user is not restricted, and that designates a display pattern of the setting information as a display pattern that is non-user-changeable when changing of the setting information by a user is restricted;

a display information control component that controls a display component to display the screen information in accordance with the designation; and a processing component that executes the first process to the document data based on screen information changed by a user through the display component.

* * * * *